United States Patent

[11] 3,575,097

| [72] | Inventor | Frank J. Gonzalez |
| | | Morton Grove, Ill. |
| [21] | Appl. No. | 798,380 |
| [22] | Filed | Feb. 11, 1969 |
| [45] | Patented | Apr. 13, 1971 |
| [73] | Assignee | Bourns/CAI, Inc. |

[54] LARGE HIGH-SPEED BETWEEN-THE-LENS SHUTTERS
10 Claims, 12 Drawing Figs.

[52] U.S. Cl. .................................................. 95/60,
95/12.5, 95/62
[51] Int. Cl. .................................................. G03b 9/26
[50] Field of Search .................................. 95/53, 58, 59, 60, 62, 12.5

[56] References Cited
UNITED STATES PATENTS

| 2,347,700 | 5/1944 | Aronoff | 95/59X |
| 2,485,119 | 10/1949 | Steiner | 95/12.5(UX) |
| 3,191,515 | 6/1965 | Findlay | 95/12.5X |
| 3,249,034 | 5/1966 | Burgarella | 95/53 |

Primary Examiner—Samuel S. Matthews
Assistant Examiner—Monroe H. Hayes
Attorney—Louis Bernat

ABSTRACT: A pair of large, scissorlike shutter blades are arranged in tandem to operate through a four-step exposure cycle. Clutch and brake mechanisms cock, open, and stop the shutter motion. Both the clutch and brake include a pair of axially aligned drums with a coiled spring coaxially wrapped around them. The drums are not mechanically coupled with each other when the spring is relaxed, but they effectively become a single unit when the spring is wound up to grip the surfaces of the two aligned drums. This way one drum in the pair may be driven in the case of a clutch, or stopped in the case of a brake, by the other drum.

Patented April 13, 1971

INVENTOR.
FRANK J. GONZALEZ

BY Louis Bernat
ATTY

Patented April 13, 1971

INVENTOR.
FRANK J. GONZALEZ
BY Louis Bernat
ATTY.

Patented April 13, 1971

INVENTOR.
FRANK J. GONZALEZ

BY Louis Bernat

ATTY

Patented April 13, 1971

INVENTOR.

FRANK J. GONZALEZ

BY Louis Bernat

LARGE HIGH-SPEED BETWEEN-THE-LENS SHUTTERS

This invention relates especially—although not exclusively—to aerial cameras, and more particularly to extremely large, high-speed between-the-lens shutters.

Relatively large aperture lens are used in cameras of the type described herein because they are most useful at night. This means that the shutter mechanisms must also be relatively large and, therefore, have a great inertia. However, such inertia cannot be allowed to slow the shutter speed because exposures are made during pyrotechnic illuminants which are very short light pulses. Hence, the large bulk and high-speed response impose mutually conflicting requirements upon the shutter mechanism.

The requirements for a shutter of the described type may vary from camera to camera and from mission to mission. Nevertheless, it might be instructive to here list a few exemplary specifications which illustrate the problems. The lens diameter might be of the order of 4 to 6 inches; usable with either infrared or visual light, with a relative illumination of 25 percent at 28. The lens should open fully in about 4 milliseconds, or less. Moreover, there must be a positive response to a pyrotechnic light pulse to insure against a loss of imagery owing to extraneous light entering the lens due to faulty synchronism.

Accordingly, an object of this invention is to provide new and improved ultra-high-speed shutter mechanisms for large aperture cameras. Another object is to better synchronize shutter operations with fast rising light pulses.

Yet another object is to provide practical devices for accomplishing the above-mentioned and other objects. More particularly, an object is to provide nearly instantaneously available power to operate the shutter. Conversely, an object is to provide sudden acting braking mechanisms to stop the fast moving shutter blades. Here an object is to avoid excessive wear upon the clutch and brake means.

Still other objects will readily occur to those who are skilled in the art.

In keeping with an aspect of the invention, these and other objects are accomplished by two tandem arranged scissorlike shutter blades which operate through a four-step cycle, including the steps of: (1) storing energy in a pair of power springs individually associated with two blades, (2) releasing one spring to open one pair of the shutter blades and start an exposure period, (3) releasing the other spring after an exposure interval to close the other set of blades and end the exposure period, and (4) driving the blades through a reset cycle to return them to the cocked condition of step 1.

The problems of fast operation and sudden stopping of the blades are solved by unique clutch and brake mechanisms. In each mechanism, there are a pair of coaxially mounted drums. A single coiled spring coaxially wraps around the outside of the pair of drums. When the coils of the spring are relaxed, the drums may turn (or stand immobile) independently of each other. But, when the coil spring is tensioned, it winds up to grip the two coaxial drums and to force them to behave as a single unit. In the clutch mechanism, one drum is driven by a motor, and the tensioned coil spring forces the other dynamic drum to turn as a unit and in synchronism with the driven drum. In the brake, one drum is stationary, and the tensioned coil spring prevents the other dynamic drum from turning.

A preferred embodiment of the invention will be understood best from the following description, when taken in connection with the attached drawings, in which.

Figure 1:
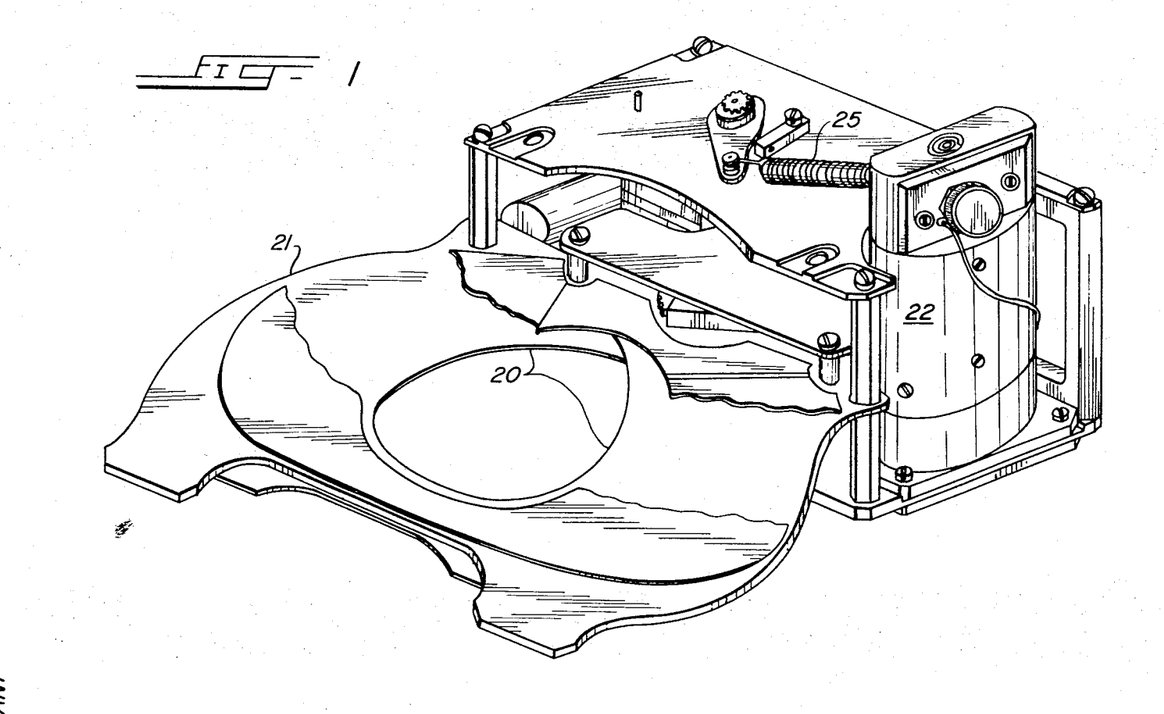
FIG. 1 is a front perspective view of the shutter mechanism with some parts broken away in order to disclose the inventive brake and clutch.
Figure 2:
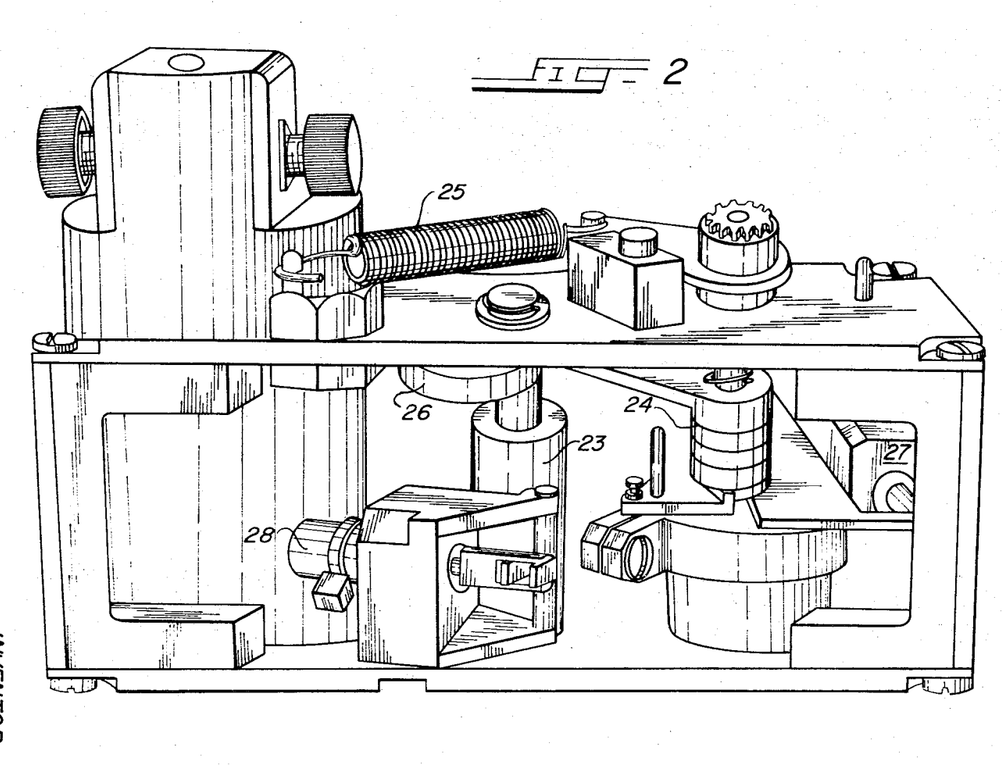
FIG. 2 is a back perspective view of the shutter mechanism showing the brake and clutch.

In greater detail, FIGS. 1 and 2 show the inventive assembly comprising a shutter and its associated control mechanism. Two of these assemblies (called A and B blades) are mounted in tandem and located between the lens in a camera. One set of blades opens to start the exposure cycle, and the other set of blades closes to end the exposure cycle.

The major divisions of this assembly are a pair of shutter blades 20 mounted on a mechanically strong supporting structure 21. A continuously running motor 22 drives the brake and clutch mechanisms 23, 24, which enable a relatively large power spring 25 to store the energy which is almost instantaneously available to operate the shutter blades 20. The clutch 23 and brake 24 are controlled by a cam 26 and two solenoids 27, 28.

The principle is that the solenoid 27 operates the clutch to enable the motor to drive the power spring 25 for storing energy and moving the shutter blades to their cocked position. The cam provides a mechanical indexing between the shutter position and the stored energy condition. The solenoid 28 releases the brake 23, and the power spring 25 snaps the shutter blades 20 to their restored position.

Both the A and B blades and their shutter control assemblies are identical except that one set of the blades is opened when in the cocked position and closed when in the released position. The other set of blades are closed when in the cocked position and opened when in the released position. This sequence may be understood best from a study of FIG. 3.

Figure 3:
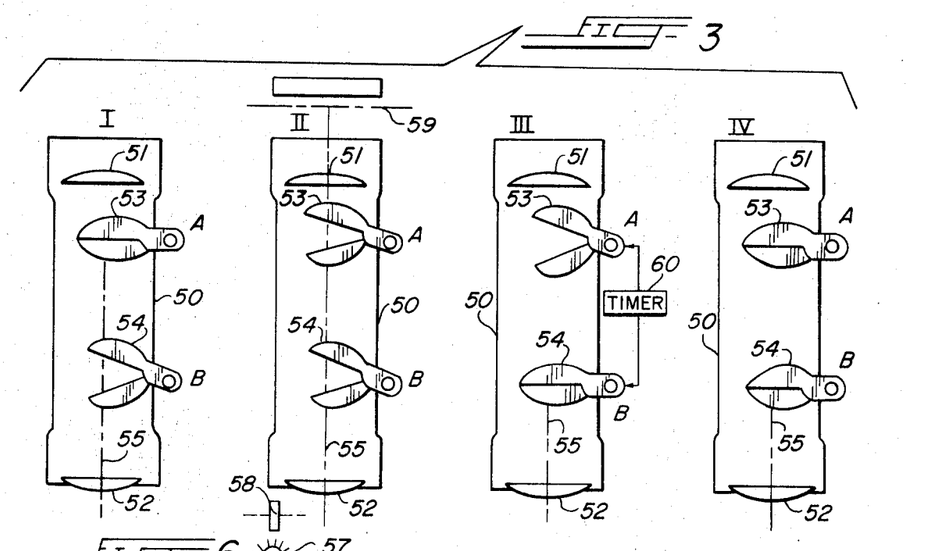
FIG. 3 is a series of schematic diagrams showing a lens and a between-the-lens shutter assembly which illustrates the four steps in the shutter cycle.

The four steps in the cycle of the shutter operation are schematically shown in FIG. 3. In each part of FIG. 3, there is a generally tube-shaped mount 50 having at least one lens element 51, 52 at each end, with a tandem mounted pair of scissorlike shutter blades 53, 54 between the lens. Either one of these blades could be the blades 20 of FIGS. 1, 2. In each case, a dot-dashed line 55 represents the light collected by the lens and chopped by the shutter.

In FIG. 3 (I), the two sets of shutter blades 53, 54 are setting in a cocked position before the start of an exposure. Thus, before anything happens, the first or A-blades 53 are in a closed position and the second or B-blades 54 open. A power spring mechanism (similar to 25) individually associated with the A and B blades 53, 54 is held under tension by brake 23 and ready to supply an almost instantaneous power when it is required. The light 55 entering the lens 52 passes through the open B-blades 54 and is stopped by the closed A-blades 53.

A pyrotechnic illuminant or pulselike flash 57 [FIG. 3 (II)], of suitable brightness, occurs and is detected by any suitable means such as a photoelectric cell 58 of known design. Responsive thereto, the A-blades 53 snap open to their released position under the power stored in the spring mechanism 25 during the windup or reset cycle. When the shutter blades 53 open, the light 55 reaches the film 59 in the camera to start the exposure period.

After the A-blades 53 open, a period of time is measured by a suitable timer 60 [FIG. 3 (III)], which may be included in an electronic control. Then the power spring associated with the B-blades 54 is released to snap them shut. This action by the B-blades chops the light beam 55 to terminate the exposure period.

Thereafter [FIG. 3 (IV)], the A-blades 53 close as part of the recycling process, and this can happen relatively slowly. In doing so, the power spring 25 is again tensioned to store energy. Then, the B-blades 54 are reopened [FIG. 3 (I)] to complete the recycling and return the shutters to their start condition. Again, a power spring (similar to 25) is tensioned to store energy for closing the B-blades at the end of exposure. The shutter mechanism is now cocked and ready for the next exposure cycle.

Figure 4:
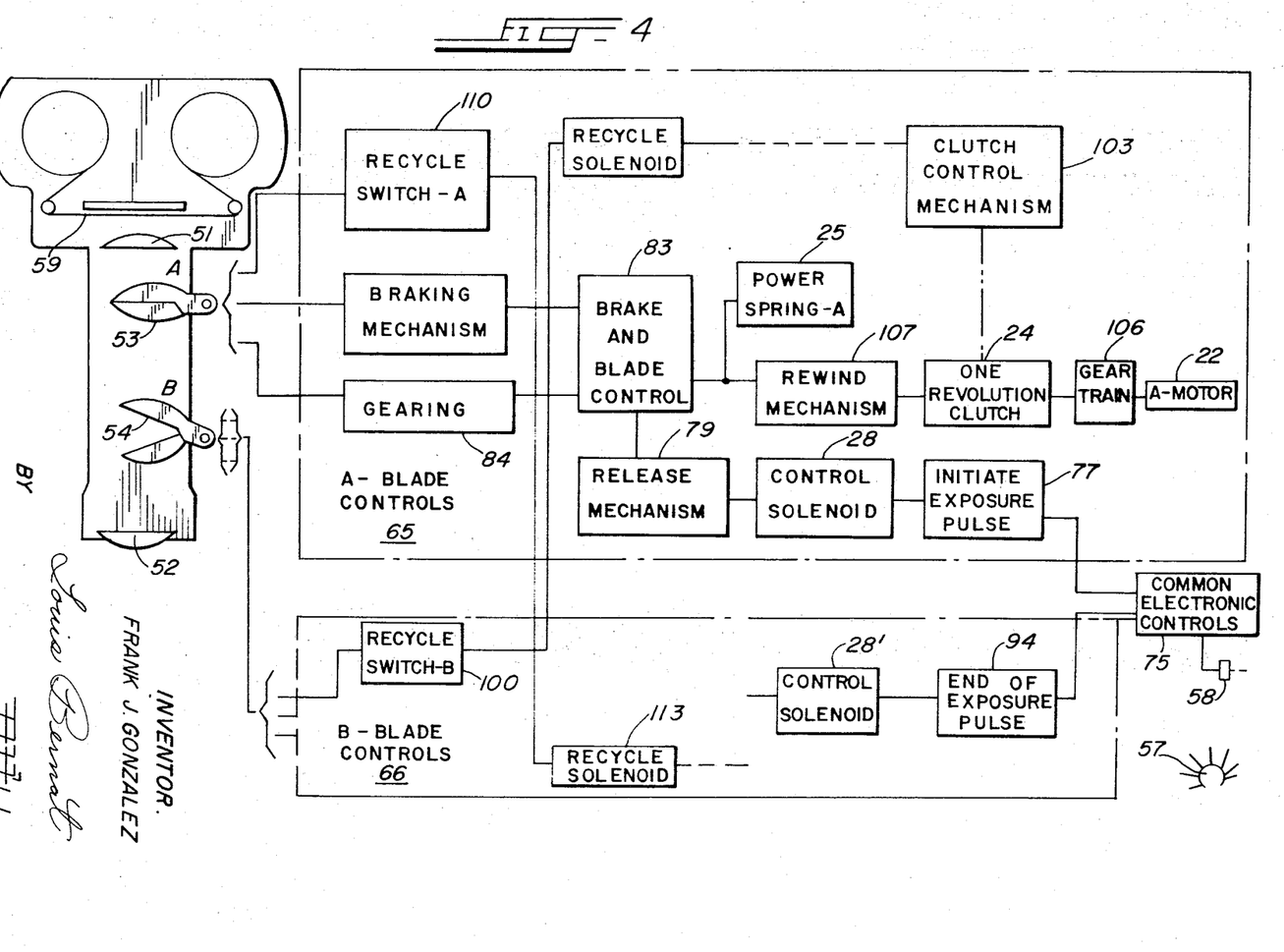
FIG. 4 is a block diagram broadly showing the mechanism and associated controls for providing the shutter control functions.

FIG. 4 broadly illustrates the equipment which is provided to carry out the shutter cycle shown by FIG. 3. A simple comparison of reference characters will explain the relationship between the similar components in FIGS. 3 and 4.

Each of the two shutter blades 53, 54 is controlled by essentially the same combination of mechanical and electrical parts and assemblies. Therefore, only the A-blade controls 65 are shown in detail. It should be understood that the B-blade controls 66 are the same as controls 65 except where differences are pointed out hereinafter.

Figure 5:
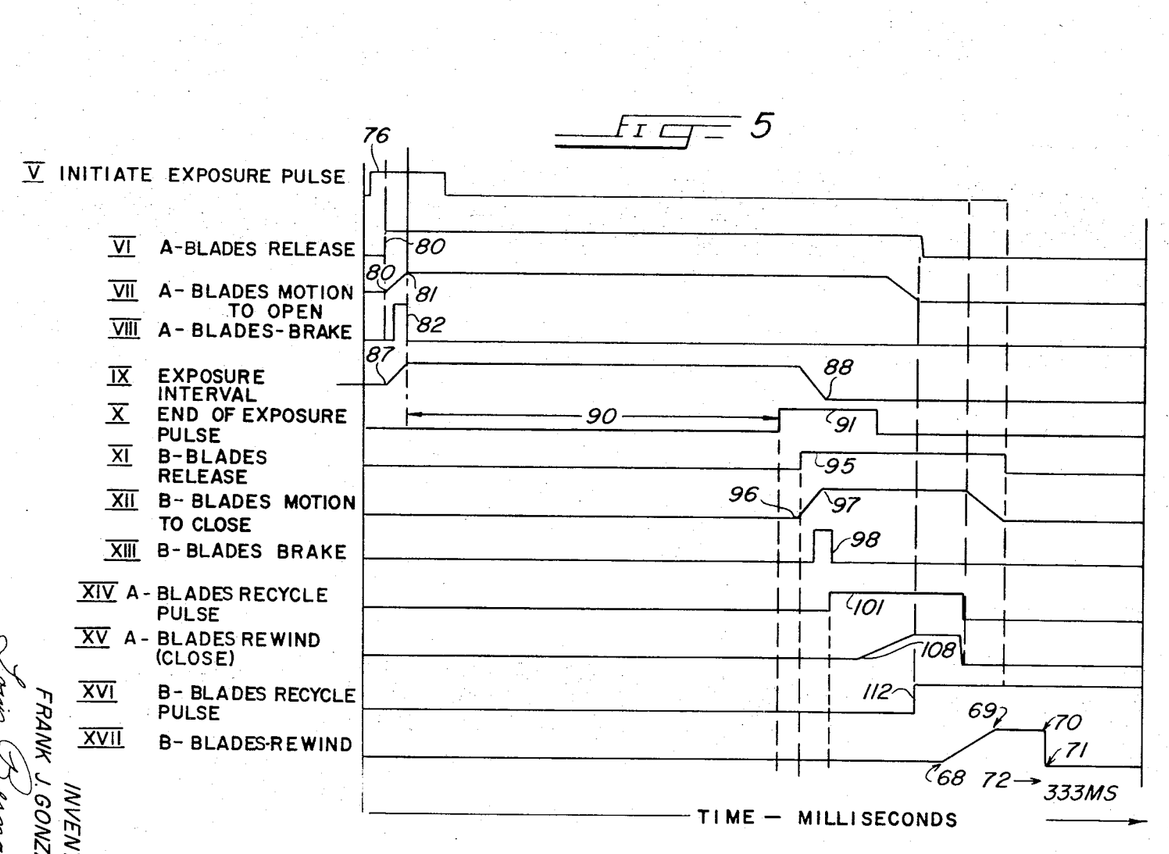
FIG. 5 is a sequence chart illustrating the manner in which the mechanism and controls interact to provide the inventive shutter operations.

The time sequence in which these controls operate is illustrated by the graph in FIG. 5. The passage of time is indicated by movement from left to right across the chart, the total width of FIG. 5 representing 333 milliseconds. The left-hand side of this figure includes a number of legends which identify the particular functions that are represented. Adjacent each legend is a line which illustrates how and when the indicated function occurs with respect to time.

For example, the bottom line XVII shows that nothing happens during the B-blade rewind cycle until the time 68 when a windup operation begins. A discrete response time is indicated by a wave form rising slowly from the point 68 to the point 69. This slow rise represents the time during which the inertia, friction, etc. are overcome while the machinery for providing the function builds up from its stationary start condition to its dynamic condition (the beginning of the function). Then, the indicated action (B-blade rewind) occurs during the time represented by the flat top of the curve appearing between the points 69, 70. At the point 70, the brakes are slammed on to stop the rewind of the B-blades. The fast braking response is indicated by the steep fall in the waveform between the points 70, 71. As indicated at 72, the total elapsed time between the start of an exposure responsive to an occurrence of a pyrotechnic flash and the close of the B-blades is about 333 milliseconds, in one exemplary camera. There could, of course, be a different timed relationship for other cameras, and the shutter speed can also be varied within a given camera.

Before the flash 57 occurs, the shutter is cocked with energy stored in power springs 25, and the camera is standing in the condition shown by FIG. 3 (I). The A-blades 53 are shut; the B-blades 54 are open. Both blades are cocked and latched. Unexposed film is wound into a format area. The camera is then ready for an exposure.

When a flash 57 occurs, the controls generate a start of exposure pulse 76, as indicated at the start of FIG. 5 (V). The source of the flash is not important. Maybe a high flying airplane has dropped a flare. A suitable means 58 (FIGS. 3 and 4) detects the flare and signals the common electronic thereto, an electronic-electromechanical interface circuit 77 sends power to a control solenoid 28. A release mechanism 79 then triggers a blade-and-brake control circuit 83 to release the A-blades 53 [FIG. 3 (II)]. Power is applied from power spring 25 through a gear train 84 to open the A-blades 53. A very short period of time 80—81 is required for the A-blades to overcome inertia and open completely. Pulse 82 [FIG. 5 (VIII)] represents the time required for braking to occur—it is not an electrical pulse.

Exposure begins when the A-blades 53 open and the shutter reaches the state shown in FIG. 3 (II). The light 55 strikes the film 59. The exposure interval 87, 88 [FIG. 5 (IX)] rises as the A-blades 53 open, and continues at full exposure until the B-blades 54 shut within the time interval represented by the falling waveform at 88.

Near the end of the exposure period, the common electronic control circuit 75 reaches the end of a measured period of time 90 [FIG. 5 (X)], and then it generates an end-of-exposure pulse 91. An electronic-to-electromechanical interface circuit 94 (FIG. 4) receives the pulse 91 and applies it to a control solenoid 28' with results similar to those (described above) which occur when the initiated pulse 76 is applied to the solenoid 28. However, this time the B-blades 54 close.

More particularly, a release mechanism command signal 95 [FIG. 5 (XI)] causes a brake-and-blade control circuit to unlatch a power spring 25. During a period 96—97, the B-blades 54 overcome inertia, friction, etc., and then they close. The B-blade brakes are applied at time 98. The exposure period ends at 88 [FIG. 5 (IX)] when the B-blades 54 are closed. The shutter blades have now reached the state shown in FIG. 3 (III).

Responsive to the closure of the B-blades 54, a recycle switch 100 automatically generates a pulse 101 [FIG. 5 (XIV)] and energizes a clutch control or recycle solenoid 27. A clutch control mechanism 103 then operates and closes a one-revolution clutch 24.

The continuously running A-motor 22 operates through a gear train 106 and clutch 24 to close A-blades 53 [FIG. 3 (IV)]. When the rewind mechanism 107 is driven through one complete turn, as measured by cam 26, it tensions the power spring 25, as indicated at 108 in FIG. 5 (XV). In a similar manner, an A-blade recycle switch 110 automatically sends a pulse 112 to a recycle solenoid 113 (similar to solenoid 27) which tensions a power spring 25 associated with the now opened B-blades 54.

The shutter mechanism has now returned to the state shown in FIG. 3 (I). The blades 53, 54 are latched in their normal cocked, preexposure position, and energy is stored in the power springs 25. The film is advanced in any suitable manner, and the camera is ready to take the next picture.

Figure 6:
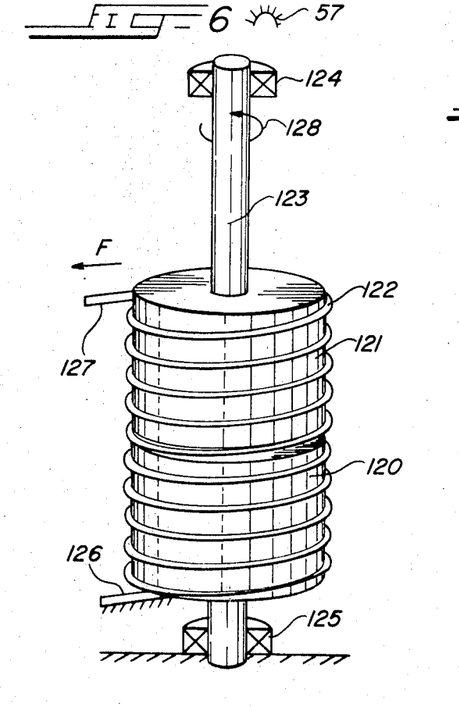
FIGS. 6 and 7 are perspective and schematic views of a clutch or brake mechanism used in the invention.
Figure 7:
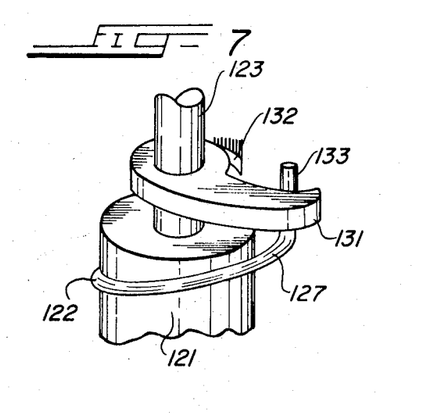

The mechanism actually used to perform these functions is shown in FIGS. 6 et seq. Most of the components in the mechanism (FIG. 8) are well known and will be readily understood from a description of their operation and function. The major exception is the wire-wrapped mechanism of the brake 23 and clutch 24, which is schematically shown in FIGS. 6 and 7.

In keeping with an aspect of the invention, both the brake and clutch include a pair of axially aligned cylinders or drums having a coiled wire spring coaxially wrapped around them. One of the drums, called a "control drum," if fixed in the case of a brake or driven in the case of a clutch. The other or controlled drum is dynamically mounted so that it is free to rotate (or not to rotate) on a shaft when the coiled spring is relaxed. When the coiled spring is wound up, it grips both of the axially aligned drums and forces them to move or stand still as a unit. Hence, in the case of a brake, the stationary drum acts as a drag to restrain the rotation of the dynamic drum. In the case of a clutch, the driven drum drives the dynamic drum.

In greater detail, FIG. 6 schematically shows a device which could be either a brake or a clutch. Two drums 120, 121 are mounted in an axially aligned relationship with a coaxial coiled spring 122 loosely encircling them. The control drum 120 is stationary in the case of a brake; it cannot rotate. In the case of a clutch, it is driven at a predetermined rate of revolution by the continuously running motor 22. The dynamic drum 121 is fixed to a shaft 123 which is, in turn, mounted in bearings 124, 125. Hence, drum 121 and shaft 123 are free to rotate—or stand still—as a unit. The coiled spring 122 takes several turns about each of the drums 120, 121. When the spring is relaxed, there is a positive clearance between it and the surface of the drums 120, 121. One end 126 of the spring is fixed in a suitable manner, and the other end 127 is connected to a force transmission device.

As long as the spring 122 remains in the relaxed condition, the dynamic drum 121 may rotate freely in a clockwise direction, as indicated by the arrow 128. However, if the end 127 is pulled, as indicated by the force F, the spring 122 winds up and grips the cylindrical surface on both of the drums 120, 121. The friction between the surface of the drums 120, 121 and the inside of the spring 122 brings the drum 121 to a halt in the case of a brake or drives it in unison with the control drum 120 in the case of a clutch.

The torque that is developed by the clutch or brake is a function of the force $F$, the number of spring turns gripping the drum, and the coefficient of friction between the spring and drum. This torque ($T$ is expressed by the formula:

$$T = FR(e^{2\pi N\mu} - 1)$$

Where:
$R$ = the radius of the drum
$F$ = the force applied at the end of the wire
$N$ = the number of turns on a drum
$\mu$ = the coefficient of friction.

One problem unique to the brake centers about a need to stop the mechanism in the same relative position after each operation. The problem is even more severe in the described camera because the shutter movement is extremely fast, the inertia is great, and the displacement is large. The resulting braking forces cause a severe wear upon the mechanism.

To solve these problems, the control brake drum may be provided with an indexing means in the form of a pawl 131 (FIG. 7) biased to a normal position by a leaf spring 132. The end 127 of the spring 122 is bent upwardly to form a spring catch 133. When the pawl 131 is stopped by the catch 133, the dynamic drum is held in the indexed position. The final stopped position occurs when a power lever acts against a semirigid pad mounted on a frame. Thus, the stopped position of the shaft 123 and drum 121 is always fixed by the relative position of the pawl 131 and the spring catch 133, and by the position of a power lever resting against the semirigid pad.

The braking forces are somewhat distributed. That is, some of these forces are absorbed by a flexing of the leaf spring 132. Some are absorbed by winding up the coiled spring 122. This way, the braking forces can be applied very fast and yet somewhat ameliorated or distributed over time by increasing spring tension.

Means are provided to prevent gouging and excessive wear so that the expected life time does not become a problem. In greater detail, despite the shock absorbing resilience of the leaf spring 132 and the windup of the spring 122, there remains a very large braking force between the spring 122 and the drum surface 121. Therefore, it is well to chrome plate the drum and to provide a surface hardness of about Rc 60—65 while the spring is made with a lesser hardness of, say, Rc 40—45. The finish on both the spring and the drum is 18 microinches/inch. Thus, the wear occurs inside the spring. It is relatively easy to replace the spring, and the unavoidable wear can be tolerated.

Figure 8:
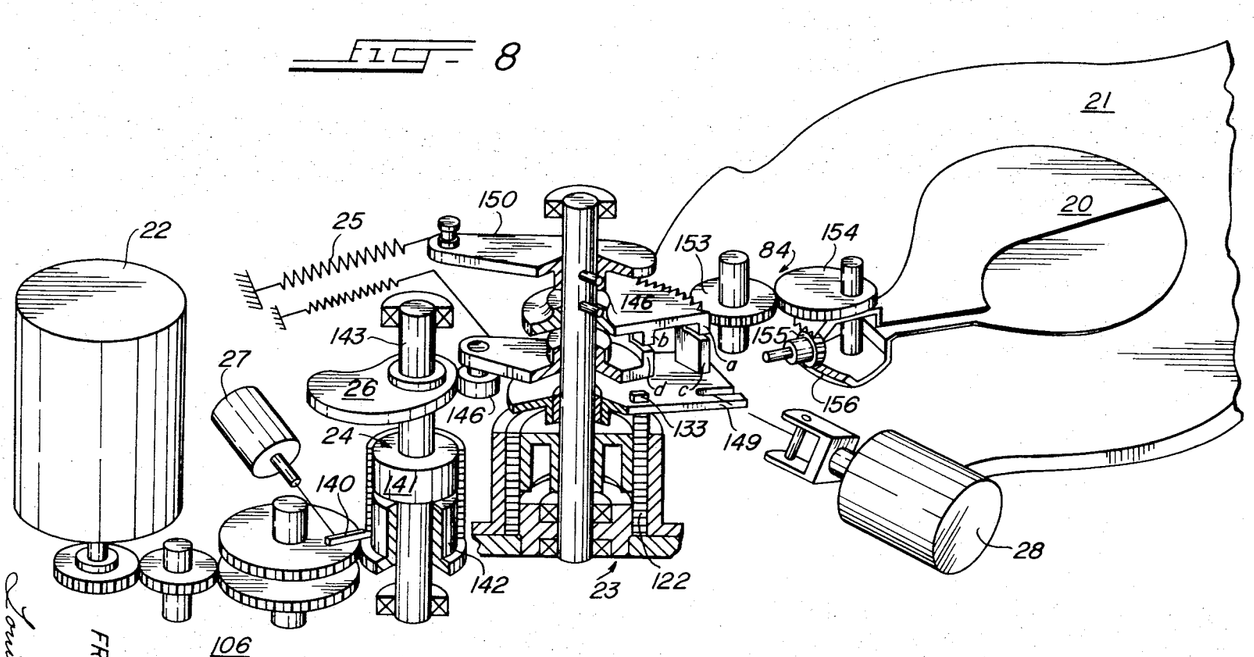
FIG. 8 is a perspective view which shows the shutter mechanism.
Figure 9:
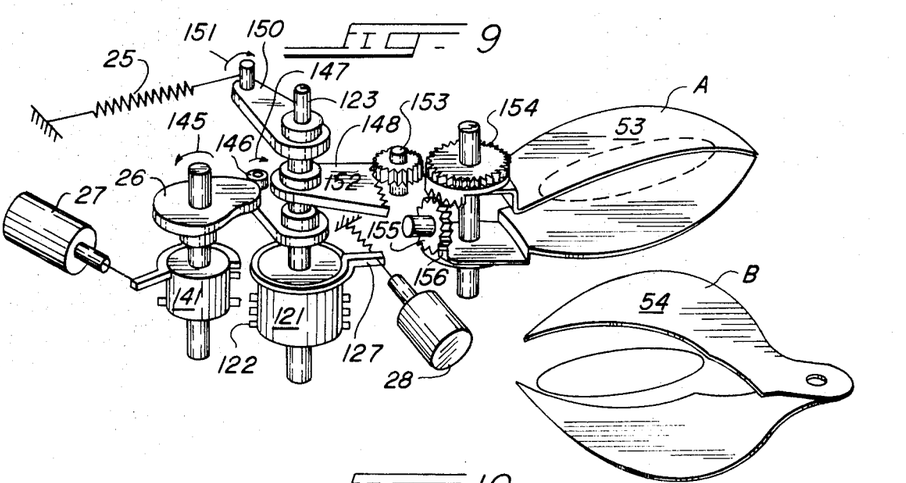
FIGS. 9—12 are four fragmentary stop-motion views, taken from FIG. 8, showing how the mechanism responds during the four steps of a complete cycle of shutter operations.
Figure 10:
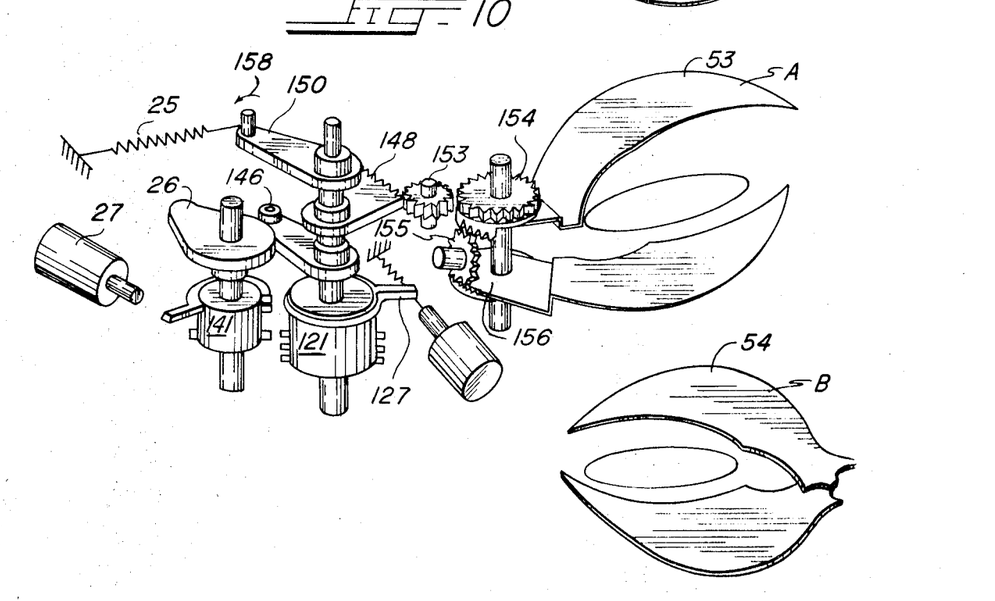
Figure 11:
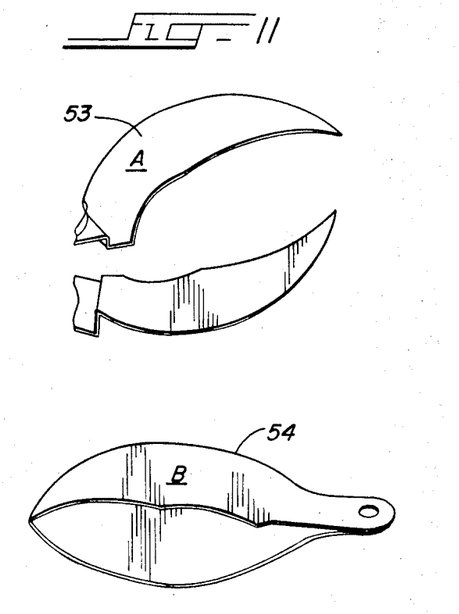
Figure 12:
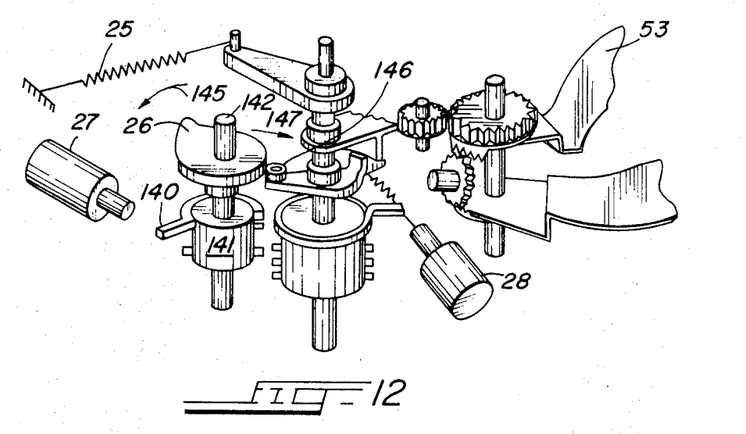

Next to be described is the operation and machinery used during an exposure cycle. For this description, reference may be made to FIGS. 8—12. FIG. 8 shows the entire mechanism; FIGS. 9—12 are fragments of FIG. 8 that show only the mechanism which is active during each of the four steps in an exposure cycle which are represented by FIG. 3.

Means are provided for cocking the shutter to bring it to the state shown by FIG. 3 (I). More particularly, when the shutter mechanism is to be cocked, the clutch or recycle solenoid 27 operates prior to pulse 76 (FIG. 5). The solenoid pulls an end of a spring 140 (FIG. 9) which winds up and grips a dynamic clutch drum 141—constructed as in FIG. 6. Responsive thereto, the continuously running motor 22 acts through a gear train 106 and drives a rotating drum 142 which is now secured to the dynamic drum 141 by the tensioned spring 140.

As the dynamic drum 141 makes one turn responsive to the motor-originated forces transmitted through spring 140, the rigidly attached shaft 143 also turns—as does its cam plate 26. The cam plate 26 (FIG. 9) swings in the direction of the arrow 145. The cam follower 146 swings in the direction of the arrow 147. This turns the shaft 123, gear 148, and lever 150 in the direction of arrow 151. The arm 150 stretches the power spring 25 to store energy preparatory to an operation of the shutter blades during the exposure cycle. As the gear 148 rotates in the direction 152, idler gear 153 turns gear 154 to close the A-blades. That is, rotation of gear 154 closes the upper A-blade and turns spider gear 155, which in turn rotates gear 156 and closes the lower A-blade. The control solenoid 28 pulls the end 127 of the spring 122 to grip the drum 121 and hold the mechanism against the urging of the power spring 25.

Hence, at the start of an exposure cycle [FIG. 3 (I)], the brake control solenoid 28 is energized, and the brake spring 122 is under tension. When the solenoid 28 is energized and the end 127 of spring is drawn to tightly grip the drums 120 and 121, the shaft 123, drum 121, and all parts rigidly associated therewith are held in the cocked position, against the urging of the power spring 25. The B-blades 54 are also locked in the energized, but open, state by a similar mechanism (not shown).

Next, assume that there is a pyrotechnic illuminant flash and the camera goes into the exposure state, as shown in FIGS. 3 (II) and 10. A suitable means detects the flash and solenoid 28 deenergizes. The end 127 of the brake spring 122 is released, and drum 121 is free to rotate. The power spring 25 pulls lever arm 150 in the direction of arrow 158. The gears 148 and 153—156 turn to open the A-blades 53 and thus start the exposure period 87 [FIG. 5 (IX)]. It takes about a 0.004 of a second for the A-blades to open fully. FIG. 8 schematically shows that the gear 148 has a pair of lugs $a$ and $b$ which strike mating lugs $c$ and $d$ (respectively) on plate 149, as the gear 148 swings while the A-blades snap to their open position. Since the end 133 of the brake spring 122 projects upwardly through a hole in plate 149, the spring 122 tends to wind up near the end of the shutter travel. This windup increases the braking forces, as indicated during pulse 82 [FIG. 5 (VIII)].

The common electronic control circuit 75 (FIG. 4) measures a period of exposure time. Then, at point 91 [FIG. 5 (X)], it releases an end-of-exposure pulse. This pulse releases a brake solenoid (not shown) which is similar to solenoid 28 but is associated with the B-blades 54. The results (FIG. 11) are essentially the same as the results which occur when the solenoid 28 is released in FIG. 10. This time, however, the B-blades 54 snap shut to end the exposure. Thus, the shutters have now reached the state which is shown in FIG. 3 (III).

The shutter is now in the deenergized state (FIG. 12), ready to be cocked, thereby completing the cycle. The clutch or recycle solenoid 27 is energized to pull the end of the clutch spring 140. The clutch spring winds up, contracts, and applies the motor energy to the dynamic drum 141. The drum 141 turns the shaft 142, and the cam 26 again rotates in the direction of the arrow 145. The cam follower 146 moves in the direction of the arrow 147, and returns the A-blades 53 to the energized state, as shown in FIG. 3 (I).

Those who are skilled in the art will readily perceive various modifications which may be made. Hence, the appended claims are to be construed to cover the full range of equivalents falling within the true scope and spirit of the invention.

I claim:

1. A shutter assembly for a camera mechanism comprising a pair of shutter blades, each of said pair having power spring means individually associated therewith for driving said blades through an exposure cycle, clutch means for moving said power spring means to a tensioned state and said blades to a closed position, and brake means for holding and releasing said power spring means when in said tensioned state and when said blades are in a closed position, whereby said tensioned spring means drive said blades through said exposure cycle when said brake means is released, both the brake and clutch means including a pair of axially aligned drums, each pair of drums having a coiled wire spring coaxially wrapped around them, there being a positive clearance space between said drums and spring when said coiled spring is relaxed, said coil gripping said two drums when said spring is tensioned.

2. The shutter assembly of claim 1 wherein one of said drums is a control drum and the other of said drums is dynamically mounted for free rotation when said coiled spring is relaxed, whereby said dynamic drum rotates freely when said coiled spring is relaxed and moves or stands as an integral unit with said control drum when said coiled spring is under tension.

3. The shutter assembly of claim 2 wherein the control drum of said brake means is stationary and said tensioned coiled spring holds said dynamic drum against the restraining force of said stationary drum.

4. The shutter assembly of claim 3 and indexing means for always stopping said dynamic drum in a fixed position.

5. The shutter assembly of claim 4 and means for distributing the braking forces as said dynamic drum comes to a stop.

6. The shutter assembly of claim 2 and means for driving the control drum of said clutch means at a predetermined rate whereby said dynamic drum stands freely when said coiled spring is relaxed and rotates as a unit with said control drum when said spring is under tension.

7. The shutter assembly of claim 1 wherein the surface of said drums is much harder than the spring whereby wear occurs on the inner surface of said spring and not on the surface of said drum.

8. The shutter assembly of claim 1 wherein said pair of shutter blades comprises tandem mounted scissorlike blades, and means for operating said blades in a four-step cycle responsive to control by said clutch and brake means, said four steps comprising (1) storing energy in said power spring means to individually operate said blades, (2) releasing one of said pair of blades to move responsive to said stored energy and start an exposure period, (3) releasing the other pair of blades to move responsive to said stored energy and end said exposure period, and (4) recycle said released blades to step 1.

9. The shutter assembly of claim 8 and a continuously running motor for applying power through said clutch means to operate said blades and to store said energy during said step 1.

10. A between-the-lens shutter comprising a motor-driven assembly, two pairs of tandemly mounted scissorlike shutter blades, means responsive to said motor for storing energy to individually operate said two pairs of blades for starting and stopping an exposure period, and control means for sequentially releasing said stored energy to said two pairs of blades to start and stop said exposure period.

UNITED STATES PATENT OFFICE
CERTIFICATE OF CORRECTION

Patent No. 3,575,097            Dated April 13, 1971

Inventor(s) Frank J. Gonzalez

It is certified that error appears in the above-identified patent and that said Letters Patent are hereby corrected as shown below:

Column 1, line 21, "28" should read -- 28! --.

Column 3, line 53, after "electronic" insert -- control 75 which generates the control pulse 76. Responsive --.

Signed and sealed this 11th day of April 1972.

(SEAL)
Attest:

EDWARD M. FLETCHER, JR.
Attesting Officer

ROGERT GOTTSCHALK
Commissioner of Paten